May 3, 1938.  R. E. POWELL  2,115,827
ELECTRIC SYSTEM AND CONTROL APPARATUS THEREFOR
Filed Oct. 8, 1935
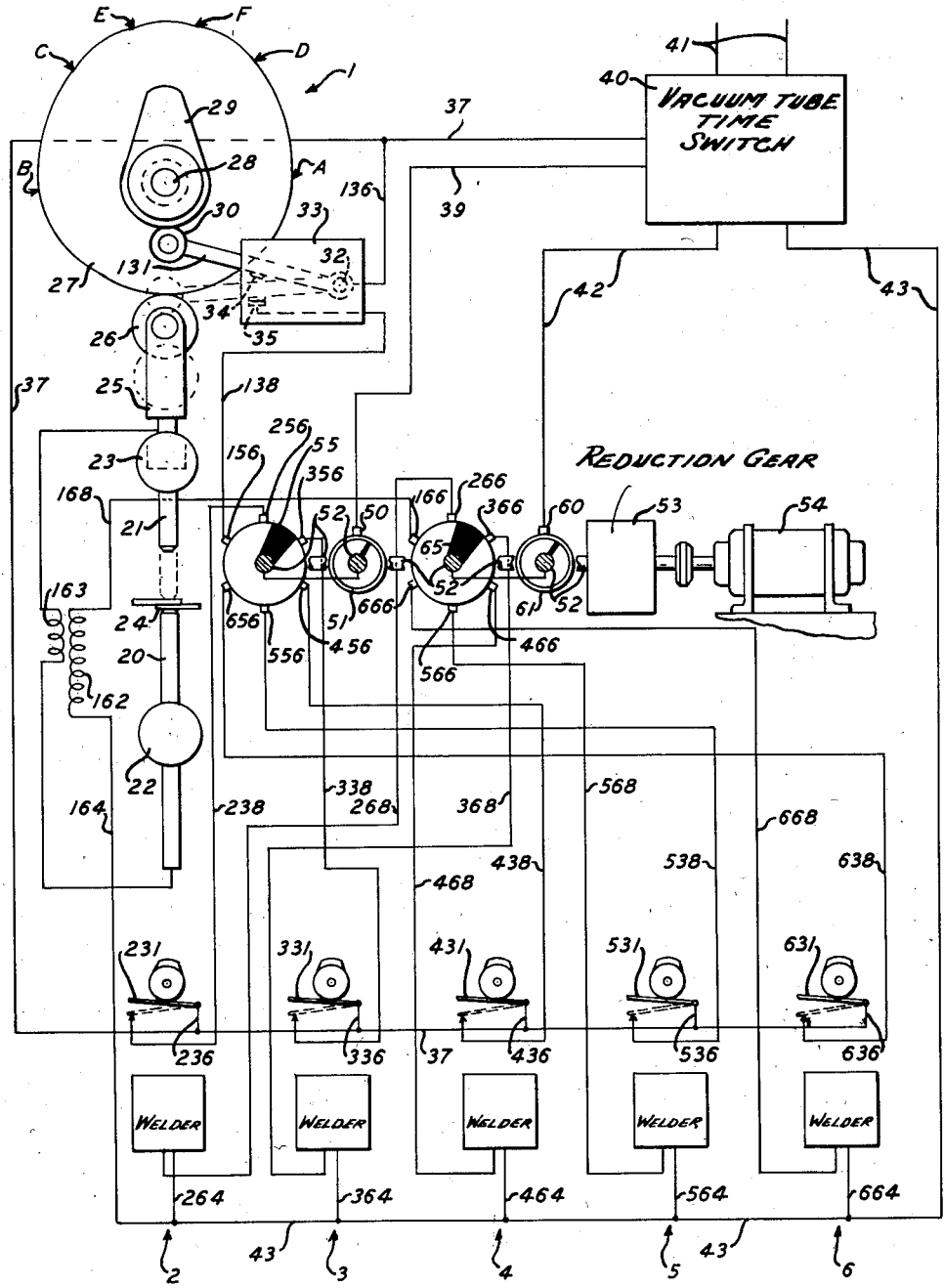
INVENTOR
R. E. POWELL
BY
E. R. Nowlan
ATTORNEY Patented May 3, 1938

2,115,827

UNITED STATES PATENT OFFICE 2,115,827

ELECTRIC SYSTEM AND CONTROL APPARATUS THEREFOR

Raymond E. Powell, Westfield, N. J., assignor to Western Electric Company, Incorporated, New York, N. Y., a corporation of New York Application October 8, 1935, Serial No. 44,051

9 Claims. (Cl. 171—97)

This invention relates to electric systems and control apparatus therefor and more particularly to apparatus for the simultaneous control of power to be intermittently supplied to each of a plurality of electrically operated machines.

Electric welding machines or presses in some instances are provided with a pair of electrodes or contacts relatively movable to recede one from the other to admit work between them and to approach one to the other again to apply current. When such a device is supplied with alternating current, it is desirable, generally, to close the welding circuit for a predetermined number of alternations of current only.

One object of the present invention is to provide a system in which and apparatus whereby a single device for controlling the closing and opening of an operating circuit may be employed to supply the operating circuits of a plurality of intermittently operated machines.

One embodiment of the invention contemplates a welding current control apparatus for connection to a pair of alternating current power supply lines and having itself an actuating circuit and a power output circuit, a plurality of welding machines, and means to connect both the actuating circuit and the power output circuit of the control means to any one of the several welding machines at will and during each period of connection of each machine to feed thereto a predetermined number of cycles of alternating current.

Other objects and features of the invention will appear from the following detailed description of one embodiment thereof taken in connection with the accompanying drawing in which the single figure is a diagrammatic representation of a group of six welding presses combined with a single power control device and with means to connect the presses to the control device, all in accordance with the invention.

In the embodiment of the invention herein disclosed, a welding press or machine, generally indicated by the numeral 1, of any suitable construction and arrangement otherwise, has a pair of welding contacts or electrodes 20 and 21, of which the lower electrode 20 is stationarily mounted in a holder 22 and the upper electrode is mounted in a holder 23 to be movable therewith from a retracted position (shown in full lines) to a second position (as shown in dotted lines) in which it is in contact with a piece of work 24 to be welded which rests on the electrode 20. The upper end of the electrode 21 is provided with a support lug 25 having a cam roller 26 rotatably mounted therein. A cam 27 to coact with the roller 26 is secured to a drive shaft 28 suitably mounted by means not shown, in the machine. This shaft is driven by motor means not shown, under control of the operator.

A circuit closing cam 29 is rigidly mounted on the shaft 28 to rotate in unison with the cam 27, and coacts with a cam roller 30 rotatably mounted on a lever 131 to move the lever, which is pivotally supported at 32 in a housing 33 mounted conveniently on a stationary part, not shown, of the machine. The lever is provided with a contact member 34 for coaction with a stationary contact 35 suitably supported within the housing 33. The contact 34 is connected via the lever 131 and its pivot 32 by a conductor 136 to one conductor 37 of the actuating circuit 37, 39 of a control device 40, and the contact 35 is connected via a conductor 138 and apparatus to be described later to the other conductor 39 of the circuit 37, 39.

The cam 27 is so proportioned that, during about one half the revolution thereof, the electrode 21 remains in its retracted position as shown in full lines, while the roller 26 runs over the cam from A to B, the cam rotating counterclockwise. From B to C the cam depresses the electrode to the operative position shown in dotted lines, holds it there from C to D and allows it to return again, from D to A. Meantime the cam 29 leaves the lever 131 unaffected during the first half revolution, while cam 27 moves over roller 26 from A to B, then cam 29 depresses the lever until contacts 34 and 35 are closed and then allows the lever to rise again. The contacts are held closed by the cam 29 while the cam 27 moves over the roller 26 from E to F. Hence the contacts are closed after the electrode 21 is pressed down into operative position, and are opened before electrode 21 leaves its operative position again.

The apparatus diagrammatically indicated at 40 is connected by wires 41, 41 to a source of alternating current not shown, and is provided with output leads 42, 43. When the actuating circuit 37, 39 is closed, the device 40 acts to feed into the leads 42, 43 a predetermined number of cycles from the wires 41, 41.

The construction and arrangement of the components of the device 40 are no part of the present invention, so only that it shall function as above described. A device of the character described, suitable for use in this connection, is described at pages 189 and 190 of the book "Electron Tubes in Industry" by Keith Henney, published in 1934 by McGraw-Hill Book Co., and in an article entitled "A Vacuum Tube Time Switch"

by W. K. Kearsley published at pages 128 and 129 in the "General Electric Review" for February 1931.

The conductor 39 is connected to a stationary brush 50, under which runs a slip ring 51 mounted on a shaft 52 driven through a reduction gear 53 by a constant speed motor 54. A distributor brush 55, also mounted on the shaft 52 and electrically connected to the ring 51, rotates within and contacts in sequence a set of six stationary contacts 156, 256, 356, 456, 556 and 656 equidistantly spaced on a circle about the shaft 52. The first of these contacts, 156, is connected by the conductor 138 to the contact 35 above described. Hence when the brush 55 is on the contact 156 and the contacts 34, 35 are closed, current may flow through the closed actuating circuit 39, 50, 51, 52, 55, 156, 138, 35, 34, 131, 32, 136 and 37 of the device 40 and the latter will then feed a predetermined number of cycles of alternating current from the mains 41, 41 to the output leads 42 and 43 of the device 40.

The lead 42 is connected to a stationary brush 60, under which runs a slip ring 61 also mounted on the shaft 52. A distributor brush 65, also mounted on the shaft 52 and electrically connected to the ring 61, rotates within and contacts in sequence a set of six stationary contacts 166, 266, 366, 466, 566 and 666, equidistantly spaced on a circle about the shaft 52. The brushes 55 and 65 are so mounted on the shaft 52 as to wipe over contacts 156 and 166 respectively, in unison, and also contact pairs 256, 266; 356, 366; 456, 466; 556, 566 and 656, 666 likewise. Contact 166 is connected by a conductor 168 to one end of the primary winding 162 of a step down transformer mounted on the welding press, whose secondary winding 163 is connected to the electrodes 21 and 22 to supply welding current thereto. The other end of the primary winding 162 is connected by a conductor 164 to the lead 43 of the device 40.

The welding press 1 is one of a set of six similar machines, generally indicated respectively at 1, 2, 3, 4, 5, 6, each connected respectively in the same way to the two sets of contacts 156, 256 etc. and 166, 266, etc., the several hundred-numbered parts being identically similar in the six several arrangements and similarly arranged and connected.

To illustrate the operation of the apparatus, let it be assumed that work 24 has been placed on the electrode 20 and under the retracted electrode 21. The operator then applies power in the customary way to the shaft 28 which revolves counterclockwise. When the point C on the cam 27 reaches the roller 26, the electrode 21 is pressed against the work 24. A short interval of time thereafter, approximately when the point E on the cam 27 reaches the roller 26 which is also when the advance shoulder of the cam 29 reaches the roller 30, the contacts 34, 35 are closed and are held closed until the point F of the cam 27 reaches the roller 26.

For convenience call the period of application of electrode 21 to the work, the period CD; and the period of closure of the contacts 34, 35, the period EF. It is clear that the period EF is always within the period CD.

The relative speeds of rotation of the shafts 28 and 52 are such that, with the shaft 52 running continuously at constant speed, during each period EF the brush 55 will wipe once and only once over the contact 156, the period of wiping being not greater than the period EF and lying within the period EF. Thus when the operator sets the shaft 28 in motion there is always the following sequence of events: the electrode 21 moves down to contact the work, later the cam 29 closes the contacts 34, 35, then the brush 55 begins to wipe over the contact 156, the brush leaves the contact, the cam 29 allows the contacts 34, 35 to open, and finally the electrode 21 is retracted from the work. If the interval of time while the brush 55 is touching the contact 156 be called the working interval, it may be said that during the working interval the control circuit 37, 39 of the device 40 is closed and the device operates to feed a predetermined number of cycles of alternating power current to the leads 42, 43 during some still smaller time interval, which may be called the welding period and which lies within the working interval. Thus the welding period lies within the working interval, which is within the interval EF, which in turn is within the interval CD. Hence during each application of the electrode 21 to the work there is one and only one application of a predetermined number of cycles of power current to the leads 42, 43 of the welding current supply.

The brush 65 runs in unison with the brush 55 and wipes over the contact 166 while the brush 55 wipes over the contact 156. Hence the power circuit 42, 43 is closed through the brush 65, the contact 166 and the transformer primary 162 during the working interval and therefore delivers one and only one predetermined set of cycles of welding current through the welding electrodes to the work during each contact of the electrode 21 with the work.

The brushes 55 and 65 are respectively narrower than the interspaces between successive contacts with which they coact and can therefore touch only one coacting fixed contact at a time. The relative speeds of the shafts 28 and 52 are preferably such that the shaft 52 makes one revolution exactly in any interval EF. Hence, assuming the several presses 1, 2, 3, 4, 5 and 6 to be operated simultaneously so that their respective intervals EF coincide, then their respective working intervals and welding periods will be distributed in regular sequence throughout their common interval EF, and no two welding periods will coincide or overlap. Although the actuating circuit may be closed by any two cams corresponding to 27 through any two or more of the levers 131, 231, etc. simultaneously, nevertheless the circuit is further closed by the brush 55 through only one at a time of the contacts 156, 256, etc.; and, correspondingly, the power circuit 42, 43 can be closed by the brush 65 through only one contact 166, 266, etc. to only one welding press at a time.

Thus the several presses 1, 2, 3, 4, 5 and 6 may be operated in any order and at any time individually, and yet each press will receive at each bringing together of its electrodes one and only one set of the predetermined number of cycles of welding current.

As herein shown, one and only one welding press is supplied with one and only one set of a predetermined number of cycles of welding current during each period of operation of the press. However, if the device 40 be of sufficient capacity to supply two presses simultaneously, two presses might be coupled into the circuits in parallel in place of each of the six presses and thus the same supply and control devices could be used to govern twelve presses, in which case two presses operated simultaneously might receive welding current simultaneously.

The embodiment of the invention herein disclosed is illustrative only and may be widely departed from and modified in many ways without departing from the spirit and scope of the invention as pointed out in and limited only by the appended claims.

What is claimed is:

1. A system comprising a plurality of intermittently operable electrical machines, and single means to supply a set of a predetermined number of cycles of alternating current to a machine, in combination with means actuated by operation of any one of the machines of the plurality to connect that machine only to the current supply means to receive one and only one set of cycles therefrom during each period of operation of said machine.

2. A system comprising a plurality of intermittently operable electrical machines all having periods of operation of the same length but each operable independently at will, and single means to supply a set of a predetermined number of cycles of alternating current to a single machine, in combination with means on each machine actuated by operation of that machine to connect the same to the supply means, and means to control the supply means to supply one and only one set of cycles to that machine only during a period of connection to the supply means.

3. A system comprising a plurality of intermittently operable electrical machines all having periods of operation of the same length but each operable independently at will, and single means to supply a set of a predetermined number of cycles of alternating current to a single machine, in combination with means on each machine actuated by operation of that machine to connect the same to the supply means, and means to control the supply means to supply one and only one set of cycles to that machine only during a period of connection to the supply means and to supply one and only one machine at a time.

4. A system comprising a plurality of intermittently operable electrical machines, and single means to supply a set of a predetermined number of cycles of alternating current to the machines, in combination with means actuated by operation of a lesser plurality of the machines to connect that lesser plurality of the machines simultaneously to the current supply means to receive simultaneously therefrom one and only one set of cycles during each period of operation of each machine of said lesser plurality.

5. A system comprising a plurality of intermittently operable electrical machines all having periods of operation of the same length but each operable independently at will, and single means to supply a set of a predetermined number of cycles of alternating current to a lesser plurality of machines, in combination with means on each machine actuated by the operation of that machine to connect the same to the supply means, and means to control the supply means to supply one and only one set of cycles to each of the machines during a period of connection to the supply means.

6. In a system comprising a plurality of electrical machines each independently operable at will for a limited period of time and a single control means having an actuating circuit and an output circuit and arranged to deliver a set of a predetermined number of cycles of alternating current upon closure of the actuating circuit, means to connect any one of the plurality of machines upon the operation thereof to the actuating circuit of the control to close the actuating circuit and means to simultaneously connect the same machine to the output circuit to receive current therefrom.

7. In a system comprising a plurality of electrical machines each independently operable at will for a limited period of time and a single control means having an actuating circuit and an output circuit and arranged to deliver a set of a predetermined number of cycles of alternating current upon closure of the actuating circuit, means to connect any one of the plurality of machines upon the operation thereof to the actuating circuit of the control to close the actuating circuit and means to simultaneously connect the same machine to the output circuit to receive current therefrom and comprising a rotary switch connected in the actuating circuit and a rotary switch connected in the output circuit and means to drive the two switches in synchronism.

8. In a system comprising a plurality of intermittently operable electrical machines in combination with single means to supply a set of a predetermined number of cycles of alternating current to a machine and which supply means has an actuating circuit and an output circuit, means to control current from the supply means to the plurality of machines, comprising a switch operating to connect the machines one at a time in sequence to the output circuit, a plurality of switches each operated by one and only one of the plurality of machines when that machine is operated and all the plurality of switches being connected in parallel in one side of the control circuit, a switch in the other side of the control circuit operating to connect that side to the plurality of switches one at a time in sequence, and means to operate the first named switch and the last named switch in unison.

9. In a system comprising a plurality of intermittently operable electrical machines in combination with single means to supply a set of a predetermined number of cycles of alternating current to a machine and which supply means has an actuating circuit and an output circuit, means to control current from the supply means to the plurality of machines, comprising a rotary switch operating to connect the machines one at a time in sequence to the output circuit, a plurality of switches each operated by one and only one of the plurality of machines when that machine is operated and all the plurality of switches being connected in parallel in one side of the control circuit, a rotary switch in the other side of the control circuit operating to connect that side to the plurality of switches one at a time in sequence, and means to drive the first named rotary switch and the last named rotary switch in synchronism.

RAYMOND E. POWELL.